Patented June 10, 1947

2,422,170

UNITED STATES PATENT OFFICE 2,422,170

SULFANILYLSULFANILAMIDE

Maurice L. Moore, Detroit, Mich., assignor to Sharp & Dohme, Incorporated, Philadelphia, Pa., a corporation of Maryland No Drawing. Application July 5, 1943,
Serial No. 493,577

10 Claims. (Cl. 260—397.7)

This invention relates to $N^4$-carboxyacyl-sulfanilylsulfanilamides, in which the carboxyacyl group is the radical remaining when the hydroxyl group is removed from only one of the two or more carboxyl groups of a polycarboxylic acid, and the invention covers such products containing the remaining carboxyl group or groups unaltered as well as with the hydrogen in any of such remaining carboxyl groups replaced by a carboxylate-forming element or radical.

The new products of this invention are in general therapeutically useful in varying degrees and applications, for example, in treating ailments of the intestinal tract.

The products of this invention may be represented by the general formula

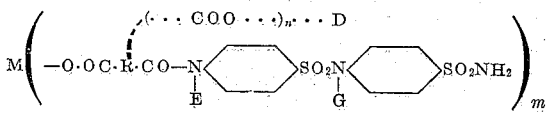

in which M is selected from hydrogen and monovalent and polyvalent radicals capable of combining with a carboxyl radical to form a carboxylate, such as the alkali metals sodium, potassium, lithium and the like, the alkaline earths as calcium, magnesium, barium and the like, antimony, copper, gold, iron, bismuth and manganese and the like, an alkyl radical, a nitrogen base as ammonium and corresponding radicals of alkyl amines and alkanolamines and the like; and R is the residue of a polycarboxylic acid, aliphatic as well as aromatic, stripped of its carboxyl groups; and D is selected from hydrogen and the M-monovalent radicals and free valences of the M-polyvalent radicals not satisfied by the single carboxyl group shown directly linked to M; and $n$ is selected from zero and any whole number up to four, whereby the grouping $$(\ldots COO \ldots)_n \ldots D$$

represents the carboxyl and the carboxylate groups over two from any polycarboxylic acid having more than two carboxyl groups, and $m$ is a small number selected from the class consisting of (A) one, in those compounds embraced herein in which all of the carboxyl groups in the carboxyacyl radical satisfy all of the valences of any polyvalent radicals represented by M and D, and (B) a small number equal to the valences of M, in those compounds embraced herein and selected from those (a) in which $n$ is zero, (b) in which each occurrence of the radical D is selected from hydrogen and any of the monovalent radicals represented by D, and (c) in which each occurrence of the radical D is different from the radical M; and E and G are each separately selected from hydrogen and alkyl, aralkyl and aryl radicals.

The carboxyacyl group (remaining group when the hydroxy group is removed from only one of the at least two carboxyl groups of a polycarboxylic acid) may be derived from any desirable polycarboxylic acid, for example, aliphatic, and aromatic, such as the aliphatic polycarboxylic acids as the saturated aliphatic polycarboxylic acids such as the dicarboxylic acids, oxalic and malonic acids and their methylene-non-substituted homologues, succinic, glutaric, adipic, pimelic, suberic, azelaic and sebacic acids and the like and derivatives thereof exemplified by malonic acid and its homologues, in any of which at least one of the hydrogens of at least one of the available chain methylene groups is replaced by any desirable substituent, for example, alkyl (saturated as well as unsaturated), hydroxy, amino, carboxyl, and the like. Of such derivatives, the saturated-alkyl-substituted-methylene type is shown by the monoalkyl examples as ethyl-malonic, butyl-malonic, iso-succinic, pyrotartaric (methyl-succinic) and ethyl-succinic acids, and the saturated-dialkyls by dimethyl-malonic and diethyl-malonic acids, and the unsaturated-alkyl by allyl-malonic acid. The hydroxy-substituted-methylene type is exemplified by tartronic (hydroxy-malonic) and malic (hydroxy-succinic, in the three isomeric forms) acids and the polyhydroxy-substituted by the dihydroxy type shown by tartaric (dihydroxy-succinic) acid and the tetrahydroxy example in talomucic acid. The amino-substituted-methylene type is demonstrated by aspartic (amino-succinic) and glutamic acids. The mixed-substituted-methylene type is shown by citramalic (2-hydroxy-2-methyl butanedioic) and citric acids, the latter serving also to point out the carboxylic-substituted-methylene type.

Unsaturated aliphatic dicarboxylic acids from which the carboxyacyl radical is derived correspond to any of the above mentioned saturated examples having at least four carbon atoms and further particularized by maleic and citraconic (methylmaleic) acids and their respective isomers, fumaric and mesaconic (methylfumaric) acids.

Other aliphatic polycarboxylic acids from which the carboxyacyl radical may be derived are the tribasic, saturated as well as unsaturated, acids exemplified respectively by tricarballylic and aconitic acids and derivatives thereof as those in which any of the methylene or chain hydrogens is replaced by any desirable substituent (as pointed out in relation to the dicarboxylic acids) illustrated by citric acid.

The aromatic (aryl) polycarboxylic acids from which the carboxyacyl radical may be derived may be an aryl dicarboxylic acid or aryl tricarboxylic acid as trimellitic acid as well as one containing up to six carboxyl groups, as mellitic acid, and those having replaceable hydrogen atoms may or may not have other substituents on the aromatic nucleus. Those having no substituents on the aromatic nucleus are illustrated by the aryl dicarboxylic acids, such as the isomeric phthalic acids, phthalic (ortho), isophthalic (meta) and terephthalic (para). In those having other substituents on the nucleus, such substituents may be illustrated by alkyl (mono- and di-), alkoxy, hydroxy, halo, nitro and other common groups, for example, xylidic (or uvitic, 5-methyl-1,3-dicarboxylicbenzene), cumidic (dimethyl-phthalic), hemipic (dimethoxy-phthalic), and coccinic (hydroxy-methylphthalic) acids. While the above specifically named aromatic acids illustrate the mononuclear or phenyl-polycarboxylic acid type, these aromatic polycarboxylic acids include also those of the polynuclear type such as the naphthyl polycarboxylic acids as naphthalic (naphthalene-1,8-dicarboxylic acid), naphthalene-1,2-dicarboxylic acid, naphthalene-2,3-dicarboxylic acid, naphthalene-1,4-dicarboxylic acid and naphthalene-1,5-dicarboxylic acid.

The invention also includes the preparation of these $N^4$-carboxyacyl-sulfanilylsulfanilamides which are made by heating the desired polycarboxylic acid, its anhydride, or an ester, such as an alkyl ester, or a monohalide, such as the monochloride or a monochloride of the ester, thereof with sulfanilylsulfanilamide, either merely together or in an inert reaction medium such as an inert solvent, and as in the latter case separating the desired end product or, as in the case of the use of the ester, liberating the end product by hydrolysis, preferably alkaline, and in any case, where necessary, subjecting it to purification as by recrystallization. Thus, for example, with the aliphatic dicarboxylic acids having less than four carbon atoms in the chain, the alkyl diester of the dicarboxylic acid is reacted with the sulfanilylsulfanilamide selected. With the aliphatic acids having four and five carbon atoms in the chain and with the aromatic polycarboxylic acids having two carboxyl groups ortho to each other, the desired anhydride is taken as the starting material, while with the aliphatic acids having over five carbon atoms in the chain and with the aromatic acids having no carboxyl group in ortho position to another carboxyl group, the free acid may be heated directly with sulfanilylsulfanilamide. If desired, the monohalide or the ester of any of the acids may be used as the starting material.

The invention may be illustrated by, but not restricted to, the following:

*Example 1.—$N^4$-succinyl-$N^1$-4-sulfamylphenyl-sulfanilamide.* Four grams (4.0 gms.) of succinic anhydride was added to a refluxing mixture of ten grams (10.0 gms.) of $N^4$-sulfanilylsulfanilamide

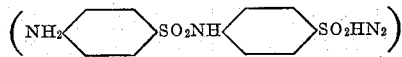

and 20 cc. of alcohol. After the reaction mixture became pasty, it was cooled and the solid collected on a filter. The crude material, melting with decomposition at 202° C., crystallized from acetone and water yielded a product decomposing at 228° C. Further purification, consisting of solution in dilute ammonia, precipitating with hydrochloric acid, followed by several crystallizations from dilute alcohol gave a product melting at 234° C. with decomposition, having the formula

By separately replacing the succinic anhydride of this example by the corresponding stoichiometric equivalent of phthalic anhydride, of the anhydride of diphenic acid, of naphthalic acid anhydride, maleic anhydride, glutaric anhydride, cumidic anhydride, hemipic anhydride and the like, there results the corresponding:

$N^4$-phthalyl-$N^1$-4-sulfamylphenylsulfanilamide,
$N^4$-diphenoyl-$N^1$-4-sulfamylphenylsulfanilamide,
$N^4$-naphthaloyl-$N^1$-4-sulfamylphenylsulfanilamide,
$N^4$-maleyl-$N^1$-4-sulfamylphenylsulfanilamide,
$N^4$-glutaryl-$N^1$-sulfamylphenylsulfanilamide,
$N^4$-cumidyl-$N^1$-sulfamylphenylsulfanilamide, and
$N^4$-hemipyl-$N^1$-sulfamylphenylsulfanilamide.

By heating separate 10 gram portions of sulfanilylsulfanilamide separately with an equimolecular weight of adipic acid, pimelic acid, suberic acid, azelaic acid and sebacic acid, at 130–150° C. for at least twenty minutes and then treating the respective reaction mixtures separately with a suitable quantity, for example, 60 cc. of 10% sodium carbonate solution, filtering off the insoluble, undesired by-products, and neutralizing the filtrate with dilute hydrochloric acid, there results the corresponding:

$N^4$-adipyl-$N^1$-4-sulfamylphenylsulfanilamide,
$N^4$-pimelyl-$N^1$-4-sulfamylphenylsulfanilamide,
$N^4$-suberyl-$N^1$-4-sulfamylphenylsulfanilamide,
$N^4$-azelayl-$N^1$-4-sulfamylphenylsulfanilamide, and
$N^4$-sebacyl-$N^1$-4-sulfamylphenylsulfanilamide.

By heating 5 grams of sulfanilylsulfanilamide with a substantial excess of ethyl oxalate on a hot plate at around 130–150° C. for about two hours with occasional stirring and then washing the reaction mixture with dilute hydrochloric acid and water and directly or after intermediate purification, for example, by recrystallizations such as from dilute alcohol, placing the reaction product in approximately 150 cc. of a 2.5% solution of sodium hydroxide and heating on the hot plate for around a half hour at 95–100° C., and then decolorizing the solution with charcoal and making it slightly acid by the addition of concentrated hydrochloric acid, there results $N^4$-oxalyl-$N^1$-4-sulfamylphenylsulfanilamide. By replacing the ethyl oxalate by ethyl malonate, there results $N^4$-malonyl-$N^1$-4-sulfamylphenyl-sulfanilamide.

The carboxylate form of any of the compounds of the invention may be prepared, for example, by adding to a small amount of water an excess of the compound over its solubility in water and dissolving the excess by stirring in a sufficient quantity of, for example, anhydrous sodium carbonate. The solution is preferably filtered and from the filtrate the highly soluble sodium salt can be isolated, for example, by adding an equal volume of alcohol and pouring the resulting solution into about 10 volumes of acetone. The substance thrown out of solution is permitted to settle and the supernatant liquid withdrawn and the residue preferably treated several times with fresh acetone. After decanting the acetone from the last treatment, the resulting desired sodium salt may be dried preferably under vacuum.

Other metal carboxylate salts of the compounds such as the copper, gold, iron and bismuth salts and the like may be obtained by reacting the alkali metal salts, preferably in aqueous solution, with a suitable soluble salt of the metal, the carboxylate salt of which is desired. The desired carboxylate salt is obtained by resulting double decomposition.

The compounds of the invention, applicable in treating ailments of the intestinal tract, exhibit such activity by the introduction to the various nuclear portions of the individual compounds, of substituents, the introduction of which into the basic nucleus leaves the compound substantially non-toxic so that it would cause no permanent injury to the subject when administered in the necessary therapeutic dosage. The metallic element in the compounds used as in preparations for treating intestinal ailments are such that their inclusion in the compound introduces similarly no unduly toxic characteristics. In general, the compounds in which the carboxyacyl radical is aliphatic and contains four carbon atoms in the aliphatic chain (including the carbons of the carbonyl groups of said chain), are particularly useful as intestinal antiseptics. Thus, for example, as with $N^4$-succinylsulfanilylsulfanilamide, it is possible to build up a high concentration in the intestinal tract without a simultaneously high blood level.

The various compounds, used in the treatment of intestinal ailments are administered orally, either in the form of tablets, capsules or powders of the solid material, or as solutions of any suitable concentration thereof.

The expressions "non-substituted" and "free of substituents" as used in the appending claims in describing a characteristic of the carboxyacyl group of the compounds covered by the respective claims are used solely to point out that the residue of the carboxyacyl group independent of the carboxyl groups of it (that is, the portion of the carboxyacyl group represented by the element R in the general formula in the third paragraph of this specification) is non-substituted or free of substituents.

While the compounds constituting the invention have been described by reference to certain specific embodiments thereof, other modifications, extensions or substitutions may be made therein within the scope of the depending claims as limited by the state of the art.

What is claimed is:

1. An $N^4$-carboxyacyl-$N^1$-(4-sulfamylphenyl)-sulfanilamide, in which the carboxyacyl group is a monoacyl radical of a dicarboxylic acid selected from the aliphatic and aromatic dicarboxylic acids.

2. An $N^4$-carboxyacyl-$N^1$-(4-sulfamylphenyl)-sulfanilamide, in which the carboxyacyl group is a monoacyl radical of an aromatic dicarboxylic acid.

3. $N^4$-phthalyl-$N^1$-(4-sulfamylphenyl)-sulfanilamide.

4. An $N^4$-carboxyacyl-$N^1$-(4-sulfamylphenyl)-sulfanilamide, in which the carboxyacyl group is a monoacyl radical of an aliphatic dicarboxylic acid.

5. An $N^4$-carboxyacyl-$N^1$-(4-sulfamylphenyl)-sulfanilamide, in which the carboxyacyl group is a monoacyl radical of a saturated aliphatic dicarboxylic acid.

6. An $N^4$-carboxyacyl-$N^1$-(4-sulfamylphenyl)-sulfanilamide, in which the carboxyacyl group is a monoacyl radical of an unsaturated aliphatic dicarboxylic acid.

7. $N^4$-maleyl-$N^1$-(4-sulfamylphenyl)-sulfanilamide.

8. An $N^4$-carboxyacyl-$N^1$-(4-sulfamylphenyl)-sulfanilamide, in which the carboxyacyl group is saturated and non-substituted aliphatic.

9. An $N^4$-carboxyacyl-$N^1$-(4-sulfamylphenyl)-sulfanilamide, in which the carboxyacyl group is unsaturated and non-substituted aliphatic.

10. $N^4$-succinyl-$N^1$-(4-sulfamylphenyl)-sulfanilamide.

MAURICE L. MOORE.

REFERENCES CITED

The following references are of record in the file of this patent:

UNITED STATES PATENTS

| Number | Name | Date |
|---|---|---|
| 2,154,248 | Northey | Apr. 11, 1939 |

FOREIGN PATENTS

| Number | Country | Date |
|---|---|---|
| 515,412 | Great Britain | 1940 |
| 510,691 | Great Britain | 1939 |
| 120,724 | Hungary | 1939 |
| 206,622 | Switzerland | 1939 |

OTHER REFERENCES

Bauer, Jour. Am. Chem. Soc., vol. 61 (1939), pp. 613-17. (Copy in P. O. Lib.)

Moore et al., Jour. Am. Chem. Soc., vol. 64 (July 1942), pp. 1572-75. (Copy in P. O. Lib.)

Ardley, Lancet, Nov. 22, 1941, page 627. Copy in Pat. Off. Lib.